Feb. 25, 1930.　　　　N. L. DERBY　　　　1,748,212
SHIM
Filed April 26, 1927
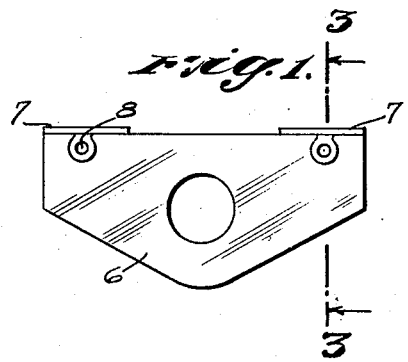
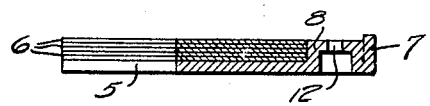
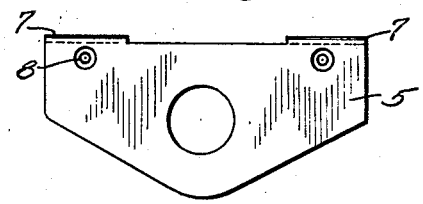
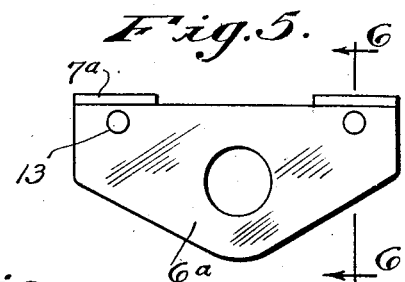
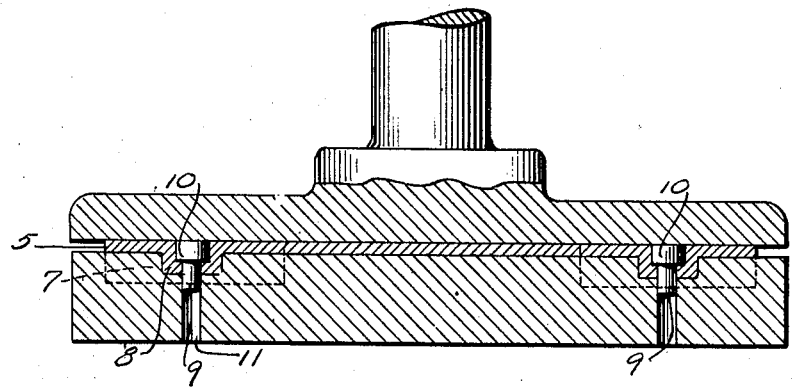
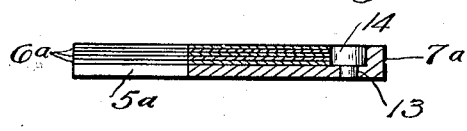
INVENTOR
Norman L. Derby
BY
Hammond & Littell
ATTORNEYS Patented Feb. 25, 1930

1,748,212

UNITED STATES PATENT OFFICE

NORMAN L. DERBY, OF LONG ISLAND CITY, NEW YORK, ASSIGNOR TO LAMINATED SHIM COMPANY, INC., OF LONG ISLAND CITY, NEW YORK, A CORPORATION OF NEW YORK

SHIM

Application filed April 26, 1927. Serial No. 186,640.

This invention relates to shims, or spacing members designed for use between the parts of a bearing, to hold the bearing members in spaced relation and to permit the bearing to be tightened when necessary by reducing the thickness of the shims.

It is an object of the present invention to provide an improved shim, especially adapted for forced feed lubrication, so constructed as to prevent the escape of oil from the bearing. To this end the shim is so constructed that a part thereof is in alignment with the bearing surfaces.

A further object of the invention is to provide an improved means for retaining the parts of a laminated shim in superposed relation.

Another object of the invention is to provide a shim having the major or base portion thereof formed of relatively cheap metal, such as bearing metal, brass, aluminum or babbitt, and providing a support for the more expensive brass or copper lamination.

Another object of the invention is to provide a shim having a base portion of relatively cheap metal, which can be formed into a support for the laminations by punching and bending the base portion from sheets of suitable metal.

The foregoing and other desirable objects are accomplished by various forms of devices embodying the invention, representative forms being illustrated in the accompanying drawing, in which:

Fig. 1 is a plan view of a shim embodying the invention;

Fig. 2 is an inverted plan view of the shim.

Fig. 3 is an enlarged vertical section, substantially on the line 3—3 of Fig. 1; and Fig. 4 is a sectional elevation showing a punch and die used in the forming of the shim base, and a shim base in the forming operation.

Fig. 5 is a plan view of a slightly modified form of shim embodying the invention.

Fig. 6 is an enlarged vertical section of the shim on the line 6—6 of Fig. 5.

The shim illustrated in Figs. 1 to 4 comprises a base or lamination support 5, of a suitable, comparatively cheap metal, such as babbitt, brass, bearing metal, or aluminum. The base, which may be of substantial thickness as compared with the laminations 6, superimposed thereon, may be cast, but is preferably prepared from sheet stock by suitable blanking and forming operations. The edge of said base 5 designed to face the bearing is provided with a pair of forwardly and upwardly extending projections or ledges 7 forming a forward stop and ledge for the shim laminations 6 and having exterior faces which are in alignment with each other and with the bearing surfaces, and are adapted to form part of the bearing surfaces. These ledges 7 thus effectively close the ends of the bearing, permitting no oil to escape, while the space between them forms an oil reservoir. Said ledges are preferably formed from extensions of the stock of the base proper, which are turned upwardly from the base form guiding and retaining means for the laminations 6. If desired, the ledge 7 may be formed to extend along the entire forward edge of the bearing instead of the two spaced ledges.

The base 5 is likewise provided with lamination locating and securing devices comprising the lugs or bosses 8, which may be conveniently struck up from the stock of the base in a suitable die, illustrated in Fig. 4. The male member of said die comprises punches having free ends 9 of reduced diameter, and base sections 10 of greater diameter. The female member comprises sockets of the height and configuration of the desired bosses, and openings 11 in said sockets for the reception of the parts 9. The die is also provided with suitable means for bending up the shim guiding and bearing engaging ledges 7. By this arrangement it will be seen that a base provided with the ledges 7 and the hollow bosses 8 may be formed complete in a single operation of the die. Each boss 8, of course, has a small aperture 12 therethrough, caused by the passage of die element 9.

The laminations 6, which preferably have approximately the size and outline of the base 5 exclusive of the ledges 7, are formed with apertures for the reception of the bosses 8, and preferably fit the bosses and ledges sufficiently closely to retain themselves in place without the use of other securing devices. The laminations, however, may if desired be secured together by the usual coating of solder. Instead of forming the bosses 8 and then assembling the laminations 6, thereon, the base 5, together with the laminations 6 may be assembled in the press and the punches 9 operated to push the metal of the base through the apertures of the laminations to form the bosses 8.

The shim illustrated in Figs. 5 and 6 is similar to the preceding form with the exception that a small riveted lug is used and a hole is drilled in the base rather than extruding a hollow boss.

This form comprises a base or lamination support $5^a$ with the ledges $7^a$ similar to the support 5 and ledges 7 previously described but being provided with a drilled hole 13 of a suitable size to receive the lug 14 which may be riveted over where it protrudes below the surface of the support $5^a$ and the portion above the support being enlarged to receive and retain the laminations $6^a$. These laminations are identical with the preceding laminations and if the lug 14 is of the same upper diameter as the extruded lugs 8 in the other form, the laminations may be interchangeable. It is possible however, to make the lugs 14 smaller and the holes punched in the laminations may be correspondingly reduced.

The lugs 14 are adapted to be readily produced in automatic screw machinery and may preferably be made out of aluminum.

The base portion 5 or $5^a$ which is made of any suitable material such as bearing metal, babbitt or aluminum, which are relatively cheap as compared with the more expensive material forming the laminations, is preferably made of a fairly hard aluminum. This material is highly satisfactory from the standpoint of withstanding pressures and not scoring a rotating shaft and may successfully be bent into a substantially upstanding, right angle position. By thus limiting the bend to 90 degrees, harder material may be used.

An unusually effective shim for pressure lubricated bearings and one from which any number of laminations may be removed as desired with a minimum of time and labor, is thus provided. The shim is, moreover, of such construction as to be easily and cheaply manufactured by a few simple operations.

The embodiments of the invention which have been illustrated and described in detail are to be considered as illustrative rather than restrictive, the inventive idea being susceptible of embodiment in many other forms, all falling within the scope of the appended claims.

What I claim as my invention is:

1. A shim comprising a one piece base member provided with a ledge integral therewith and bent upwardly substantially perpendicular thereto, a plurality of laminations superposed on said base and guided by said upturned ledge, and means projecting from and integral with said base for retaining said laminations.

2. A shim comprising a base member provided with a ledge integral therewith and bent upwardly substantially at a right angle thereto, a locating lug on said base, and a plurality of laminations superposed on said base and secured and aligned by said ledges and said lug.

3. A shim comprising a base member adapted to have superposed thereon a plurality of laminations, and having a lamination securing lug upstanding therefrom, said securing lug being integral with and projected from the face of said base member.

4. A shim comprising a base member stamped from sheet stock and provided with a pair of lamination retaining and bearing engaging ledges formed by bending upwardly extending parts of said sheet stock, and laminations superposed on said base member and guided by said ledges.

5. A shim comprising a base member of bearing metal formed from sheet stock and having a pair of bearing engaging and lamination guiding ledges extending laterally and upwardly therefrom, said ledges being formed by bending extending parts of said sheet stock at substantially a right angle thereto, lamination retaining lugs on said base and extending upwardly therefrom at points adjacent to said ledges, and laminations superposed on said base and substantially conforming thereto, said laminations being provided with apertures adapted to receive said lugs.

6. A shim comprising a base member and laminations superposed thereon, said base member being stamped from sheet stock, one edge thereof being bent upwardly at a substantial right angle to the base portion to form a retaining device for said laminations.

7. A shim comprising a base member and laminations superposed thereon, said base member being stamped from sheet stock and having parts thereof bent upwardly, substantially, perpendicular to the base portion, the base portion being provided with upstanding lugs adapted to enter grooves in said laminations for yieldingly holding said laminations in place.

In testimony whereof I have affixed my signature to this specification.

NORMAN L. DERBY.